(12) United States Patent
Bonn et al.

(10) Patent No.: US 9,137,666 B1
(45) Date of Patent: Sep. 15, 2015

(54) MOBILE SECURITY USING GRAPHICAL IMAGES

(71) Applicant: Sprint Communications Company L.P., Overland Park, KS (US)

(72) Inventors: Mark J. Bonn, Granite Bay, CA (US); Kosol Jintaseranee, Millbrae, CA (US); Sean Patrick Hoelzle, Collegeville, PA (US); Heesook Choi, Castro Valley, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 99 days.

(21) Appl. No.: 14/026,757

(22) Filed: Sep. 13, 2013

(51) Int. Cl.
*H04B 1/40* (2015.01)
*H04W 12/08* (2009.01)
*H04M 1/663* (2006.01)
*G06F 21/36* (2013.01)

(52) U.S. Cl.
CPC .............. *H04W 12/08* (2013.01); *G06F 21/36* (2013.01); *H04M 1/663* (2013.01); *H04B 1/40* (2013.01)

(58) Field of Classification Search
USPC .......... 455/438, 2.01, 411, 456.1, 414.1, 566, 455/456.3, 450, 68, 39, 70; 345/179, 173, 345/661, 501, 174; 715/744, 255, 863, 781, 715/810, 702, 835
See application file for complete search history.

(56) References Cited

U.S. PATENT DOCUMENTS

| | | | |
|---|---|---|---|
| 4,654,867 A * | 3/1987 | Labedz et al. ................. 455/438 |
| 5,559,961 A | 9/1996 | Blonder | |
| 5,581,800 A * | 12/1996 | Fardeau et al. .............. 455/2.01 |
| 5,636,292 A | 6/1997 | Rhoads | |
| 6,192,478 B1 | 2/2001 | Elledge | |
| 6,430,302 B2 * | 8/2002 | Rhoads ......................... 382/100 |
| 6,557,103 B1 | 4/2003 | Boncelet, Jr. et al. | |
| 7,174,462 B2 | 2/2007 | Pering et al. | |
| 7,185,358 B1 | 2/2007 | Schreiber et al. | |
| 7,574,739 B2 | 8/2009 | Shirakawa | |
| 7,644,868 B2 | 1/2010 | Hare | |
| 7,653,931 B1 | 1/2010 | Peterson et al. | |
| 7,657,849 B2 | 2/2010 | Chaudhri et al. | |
| 7,992,202 B2 | 8/2011 | Won et al. | |
| 8,306,504 B1 | 11/2012 | Rincker et al. | |
| 8,321,930 B1 | 11/2012 | Taylor et al. | |
| 2004/0230843 A1 * | 11/2004 | Jansen .......................... 713/202 |
| 2005/0060554 A1 | 3/2005 | O'Donoghue | |
| 2005/0154798 A1 * | 7/2005 | Nurmi .............................. 710/1 |

(Continued)

FOREIGN PATENT DOCUMENTS

EP 1372334 12/2003

OTHER PUBLICATIONS

U.S. Appl. No. 13/105,990, filed May 12, 2011.

*Primary Examiner* — Ganiyu A Hanidu (57) ABSTRACT

A wireless communication device receives a first user input indicating a function to lock. The wireless communication device receives a second user input indicating a geometric pattern. The wireless communication device receives a third user input indicating a plurality of graphical images. The wireless communication device receives a fourth user input indicating individual positions of the graphical images on the geometric pattern. The wireless communication device processes these user inputs to lock the function. The wireless communication device receives a fifth user input indicating the individual positions of the graphical images on the geometric pattern. The wireless communication device processes the fifth user input to unlock the function.

20 Claims, 9 Drawing Sheets

(56) References Cited

U.S. PATENT DOCUMENTS

| | | |
|---|---|---|
| 2006/0206919 A1 | 9/2006 | Montgomery et al. |
| 2007/0157299 A1 | 7/2007 | Hare |
| 2009/0019393 A1* | 1/2009 | Fukushima et al. .......... 715/810 |
| 2009/0038006 A1 | 2/2009 | Traenkenschuh et al. |
| 2009/0320124 A1 | 12/2009 | Taxier et al. |
| 2010/0001967 A1* | 1/2010 | Yoo .............................. 345/173 |
| 2011/0090097 A1 | 4/2011 | Beshke |
| 2012/0005483 A1 | 1/2012 | Patvarczki et al. |

* cited by examiner

MOBILE SECURITY USING GRAPHICAL IMAGES

TECHNICAL BACKGROUND

With advances in mobile technology, wireless communication devices continue to provide enhanced services. Users of wireless communication devices are increasingly using a wireless communication device for more than making and receiving calls and/or short message service (SMS or texting). Users may store important personal information, documents, images, videos, files, and/or data on their wireless communication devices. Users may access email, banking, social media, and/or other types of accounts on their wireless communication devices. Users may also conduct financial or other transactions requiring security such as chatting, social media updates, submitting payments on their wireless communication devices. With the increase and nature of the type of information and data stored on and/or accessible through a wireless communication device, increased security may be desired.

Numeric combinations, passwords, and/or codes can be used to regulate access to add a level of security. Users may have a difficult time remembering numeric combinations, passwords, or codes. Furthermore, numeric passwords have a limited number of combinations and/or permutations.

TECHNICAL OVERVIEW

A wireless communication device receives a first user input indicating a function to lock. The wireless communication device receives a second user input indicating a geometric pattern. The wireless communication device receives a third user input indicating a plurality of graphical images. The wireless communication device receives a fourth user input indicating individual positions of the graphical images on the geometric pattern. The wireless communication device processes these user inputs to lock the function. The wireless communication device receives a fifth user input indicating the individual positions of the graphical images on the geometric pattern. The wireless communication device processes the fifth user input to unlock the function.

BRIEF DESCRIPTION OF THE DRAWINGS

FIGS. 5 A-C illustrate the wireless communication device to use graphical images in mobile security.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
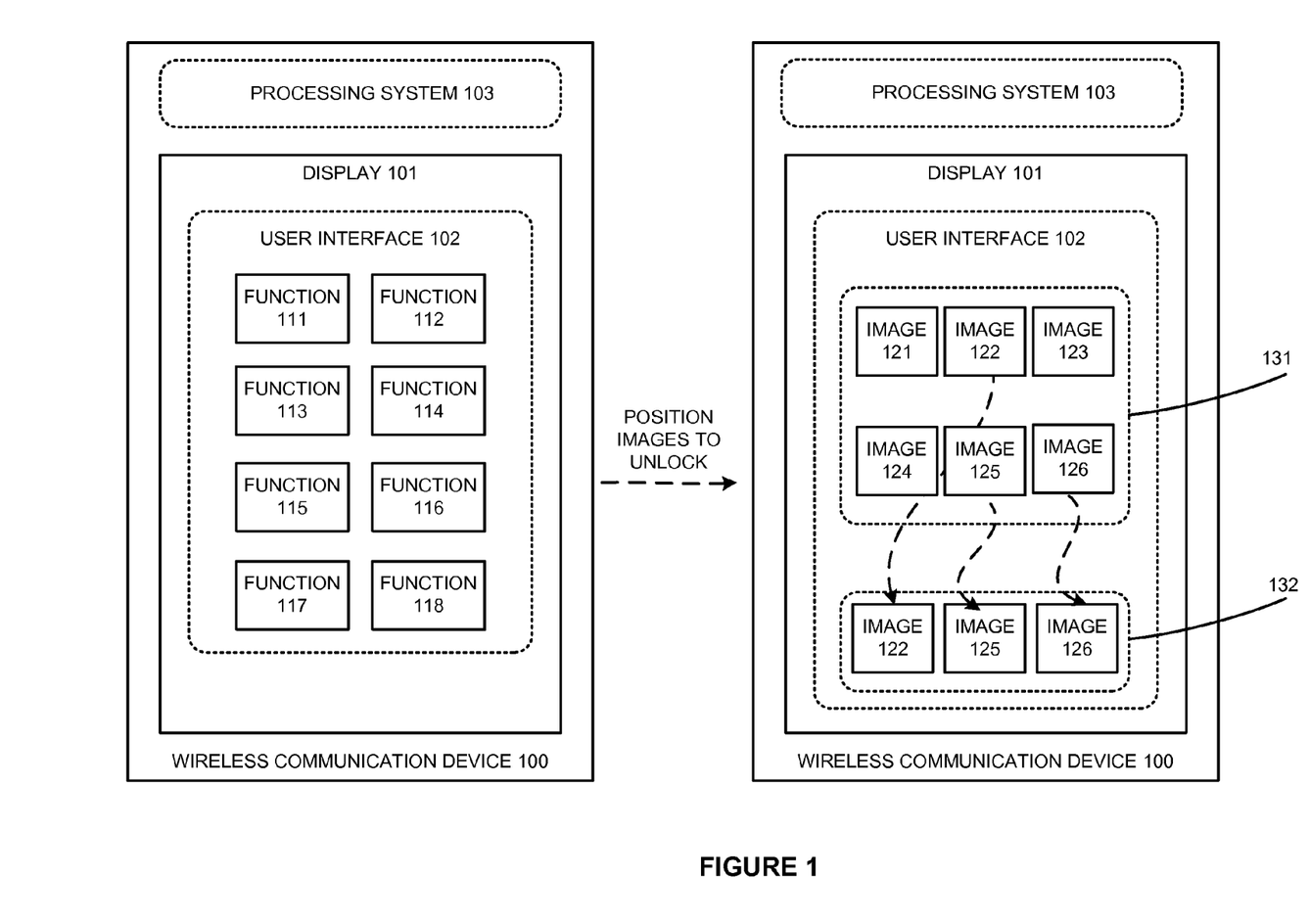
FIG. 1 illustrates a wireless communication device to use graphical images in mobile security.

FIG. 1 illustrates wireless communication device 100. Wireless communication device 100 includes display 101, user interface 102, and processing system 103. The user selects locked function 114. At the unlock screen, the user is prompted to correctly select and position graphical images 122, 125, and 126 from set of graphical images 131 on to geometric pattern 132. Set of graphical images 131 is selected from the graphical images stored on wireless communication device 100, images taken with a camera in wireless communication device 100, and/or other graphical images.

Figure 2:
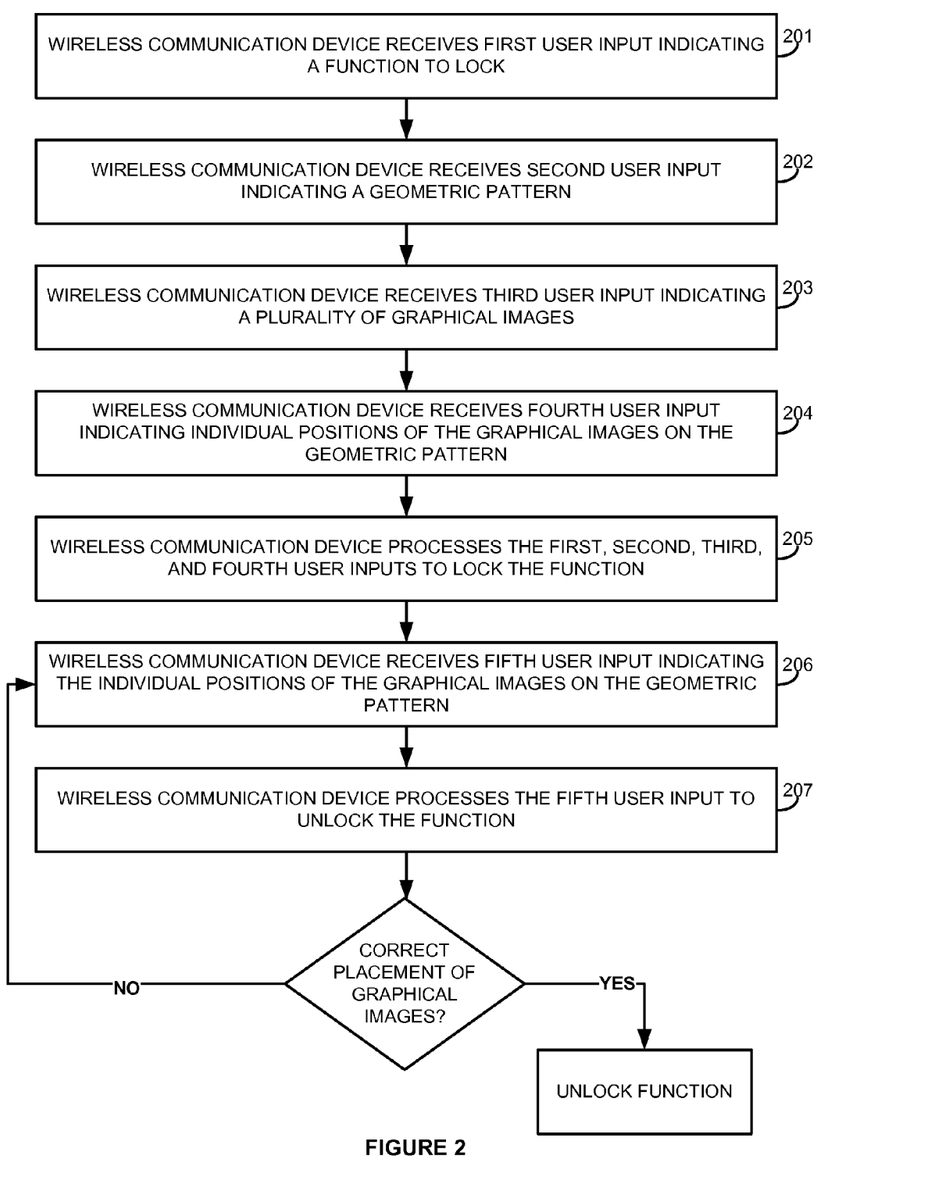
FIG. 2 illustrates the operation of the wireless communication device to use graphical images in mobile security.

FIG. 2 illustrates the operation of wireless communication device 100 to use graphical images in mobile security. Wireless communication device 101 receives first user input indicating a function to lock (201). Examples of functions include power on, wake-up from sleep mode, making calls, viewing text messages, accessing applications located on the wireless communication device, completing transactions on the wireless communication device, or some other type of wireless communication device function. Examples of applications include contact list, email, banking, camera, social media, messaging, wallet, or some other application located on the wireless communication device. Some examples of transactions include completing payment, online banking, sharing information, or some other type of transaction.

Wireless communication device 101 receives second user input indicating a geometric pattern (202). Examples of geometric patterns include a one two, or three dimensional grid. For instance, the one dimensional grid will have one row and multiple columns (y). Alternatively, the two dimensional grid will have multiple rows (x) and multiple columns (y). In other examples, a three dimensional grid, would have (x) rows, (y) columns, and (z) layers, in other words, images may be stacked on top of each other in a specified order. For example, the geometric pattern may be a classic tumbler setup, with one row and three columns. In another example, the two dimensional grid could be a two by two square. In another example, the three dimensional grid could be a two layer classic tumbler configuration.

Wireless communication device 100 receives third user input indicating a plurality of graphical images (203). Examples of the graphical images include images stored on wireless communication device 100, new images taken by the user to be used in the manner described, stock images loaded on to wireless communication device 100. Wireless communication device 100 receives fourth user input indicating individual positions of the graphical images on the geometric pattern (204). Each graphical image needs to be placed in the proper position on the geometric pattern in order to unlock the function. While the singular "input" is used, one skilled in the art would realize that the user input could comprise multiple requests and receipts of inputs from the user. Wireless communication device 100 processes the first, second, third, and fourth user inputs to lock the function (205).

Wireless communication device 100 receives fifth user input indicating the individual positions of the graphical images on the geometric pattern (206). In other words, the user places each of the graphical images into the corresponding position on the geometric pattern. Wireless communication device 100 processes the fifth user input to unlock the function (207). If the user has correctly placed the graphical image into the corresponding position on the geometric pattern, the function will unlock. Otherwise, wireless communication 100 may indicate that the placement or positioning of the graphical images was incorrect and request the user to re-try. In some cases, wireless communication device may not permit the function to be unlocked after a number of failed attempts.

In some examples, the user may specify doodle motion on a selected graphical image. In other examples, a graphical image may be the "lock" and one or more other graphical images may be the "key." For instance, the user selects a graphical image to represent the lock ("lock image") and one or more graphical images to represent the key(s) ("tumbler images"). In order to unlock the function, the user correctly selects the lock image and then positions the tumbler images on top of the lock image in the correct order. The geometric pattern, doodle motion, and image overlay may be used separately or in combination. The graphical images may also be used to store encryption/decryption keys.

Although the singular "input" is used herein, the term is meant to include the singular "input" and plural "inputs," one skilled in the art would understand that "input" may involve multiple interactions/selections/indications from the user. As used herein, first, second, third, fourth, and fifth are used to distinguish user inputs and are not used to indicate a required sequence or order.

Figure 3:
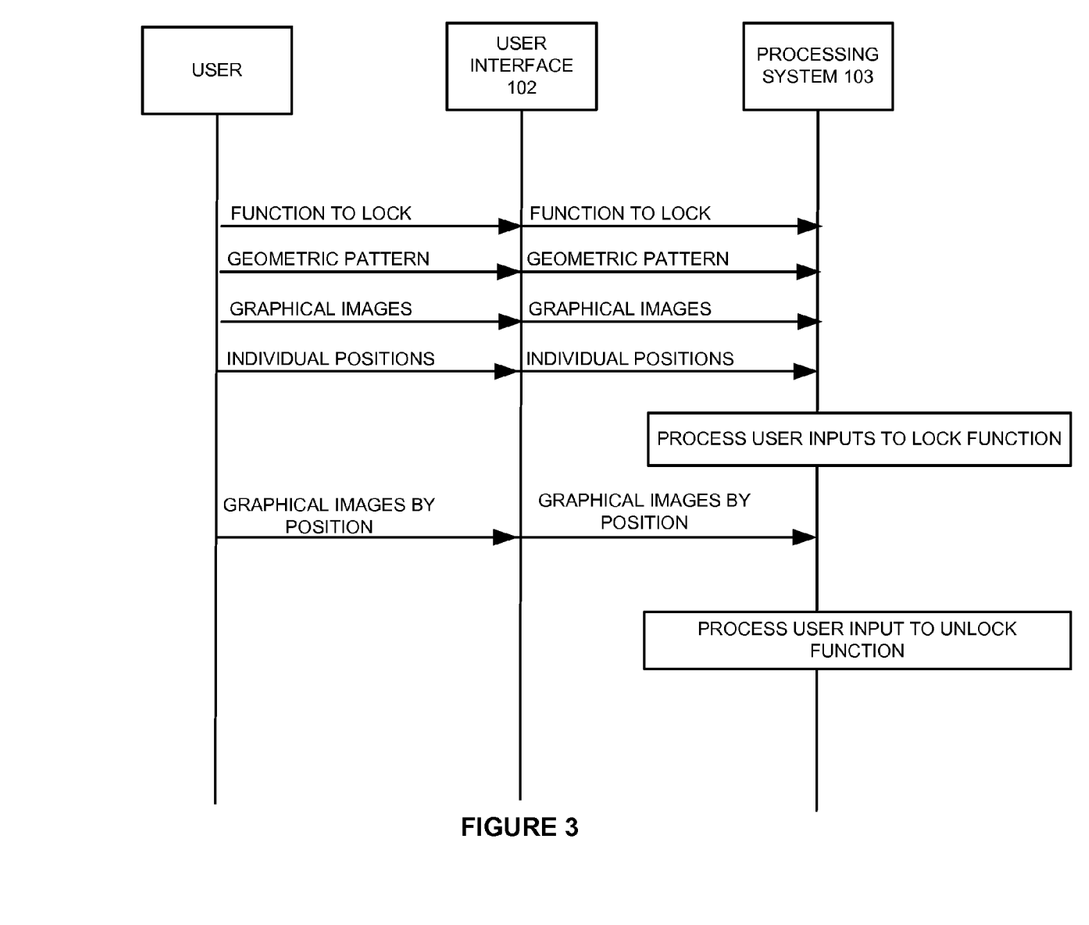
FIG. 3 illustrates the operation of the wireless communication device to use graphical images in mobile security.

FIG. 3 illustrates the operation of wireless communication device 100 to use graphical images in mobile security. The user transfers first user input indicating a function to lock to user interface 102. The user transfers second user input indicating a geometric pattern to user interface 102. The user transfers third user input indicating graphical images to user interface 102. The user transfers fourth user input indicating individual positions of the graphical images on the geometric pattern to user interface 102. Processing system 103 processes the user inputs to lock the function. User interface 102 receives fifth user input indicating the individual positions of the graphical images on the geometric pattern. Processing system 103 processes the user input to unlock the function.

Figure 4A:
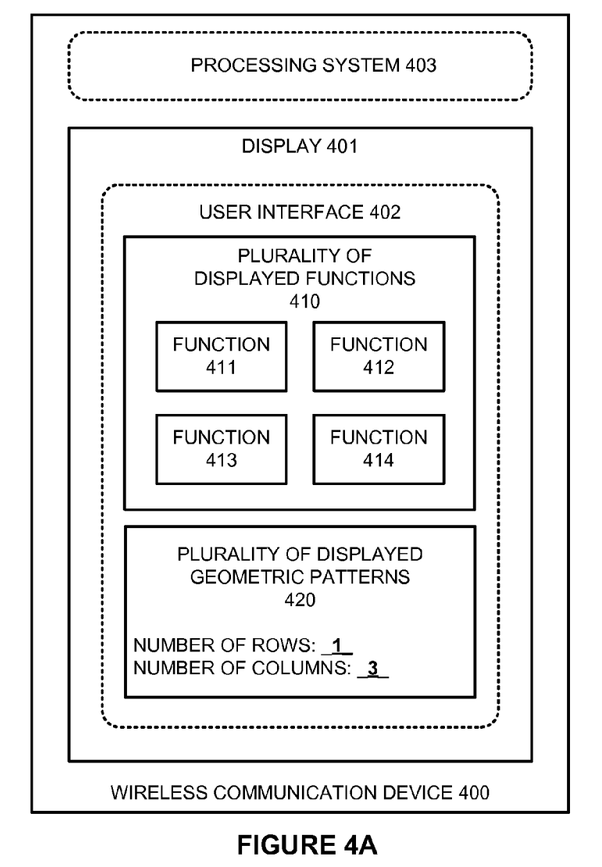
FIG. 4A illustrates the wireless communication device to use graphical images in mobile security.
Figure 4B:
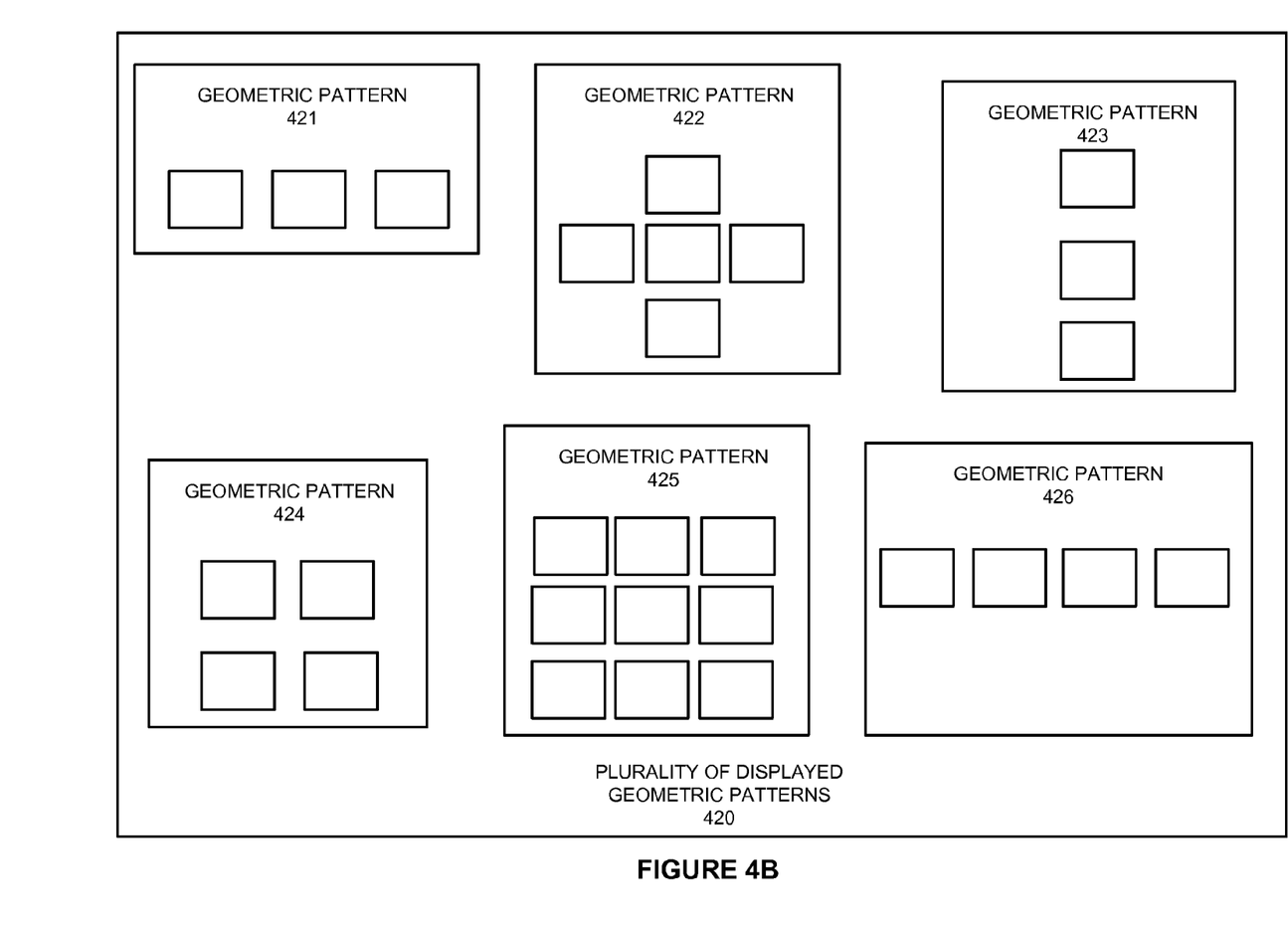
FIG. 4B illustrates different examples of geometric patterns.

FIG. 4A illustrates wireless device 400 where a user is setting up a function to be locked. Wireless communication device 400 is an example of wireless communication device 100, although these devices may use alterative configurations and operations. Wireless communication device 400 comprises display 401, user interface 402, and processing system 403. The user selects a function to be locked from set of functions 410. In this example, the user selects function 414. Next, the user selects the geometric pattern. In this example, the set of geometric patterns 420 is shown as an input of a number of rows (1) and a number of columns (3). The geometric pattern indicated is a one dimensional line with three positions. In other examples, set of geometric patterns 420 may display geometric patterns like geometric patterns 421-426 shown in FIG. 4B. Geometric patterns 421-426 are merely examples of geometric patterns, the actual geometric patterns may vary.

Figure 5A:
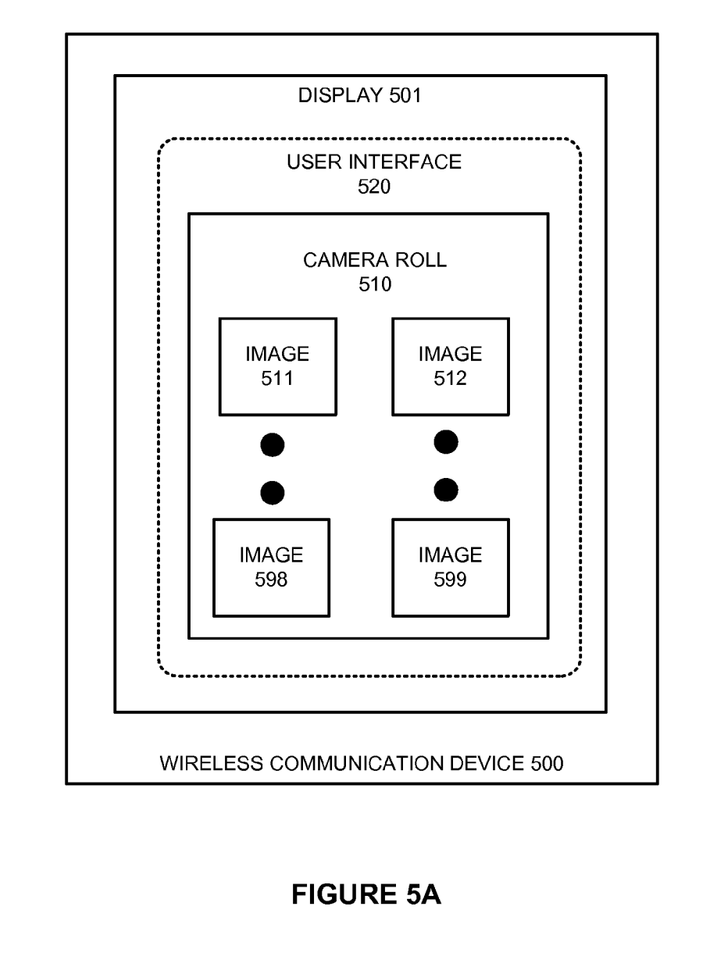
Figure 5B:
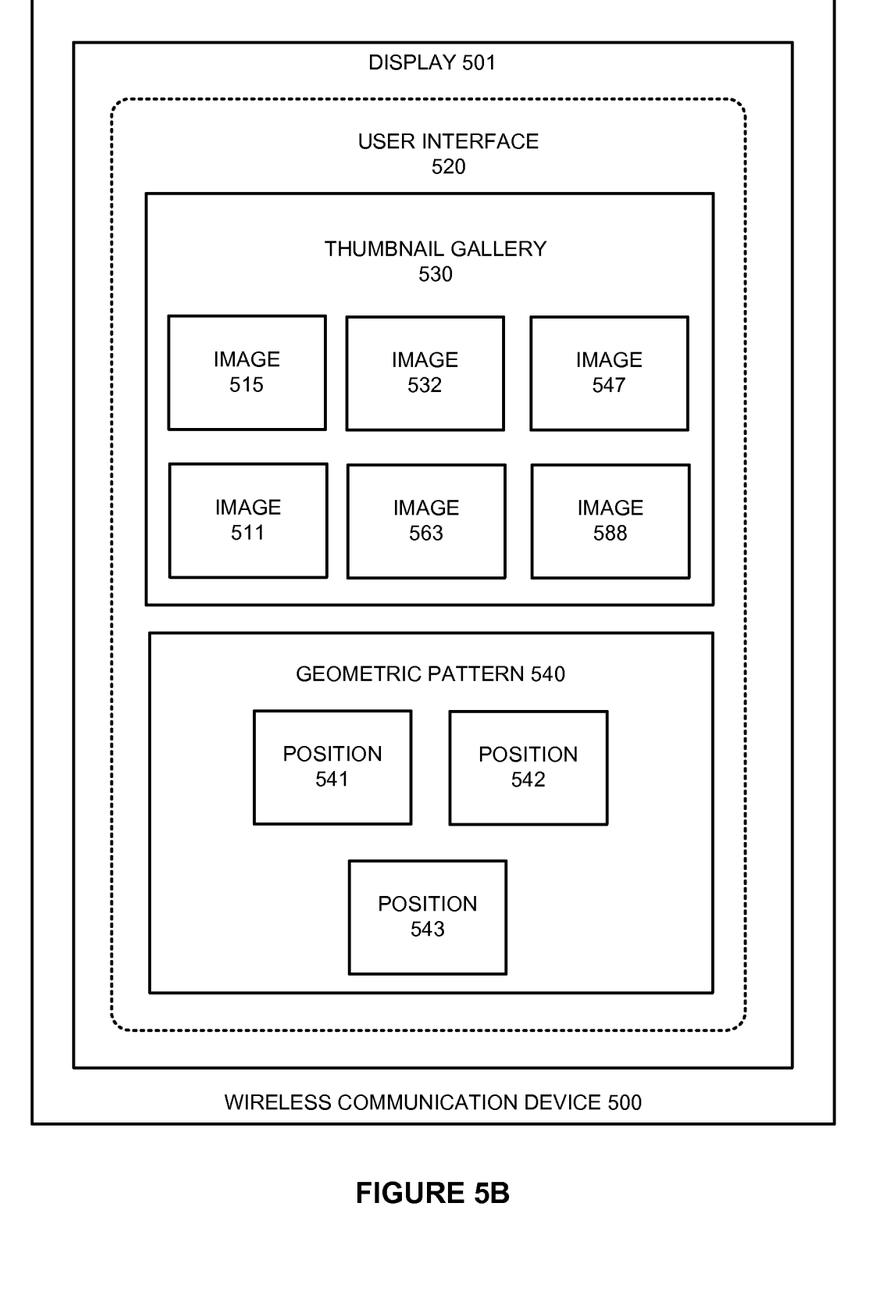
Figure 5C:
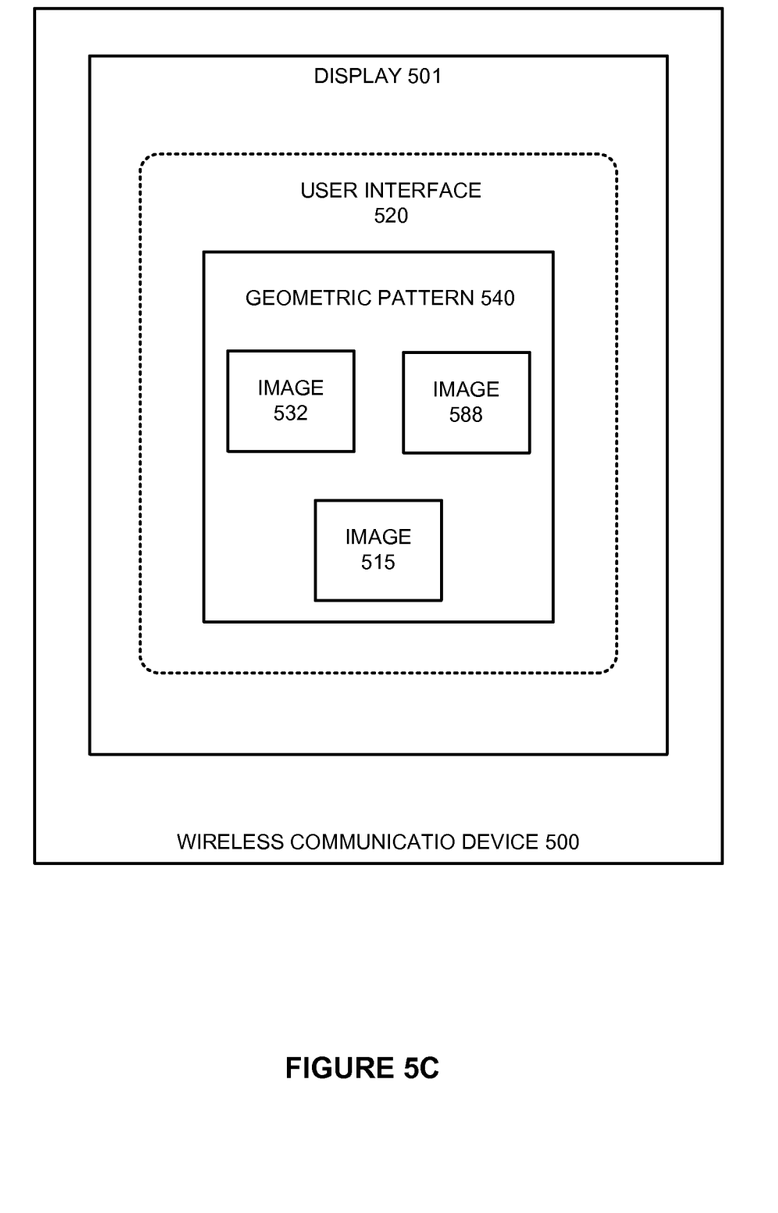

FIGS. 5A-C illustrate wireless communication device 500 using graphical images in mobile security. Wireless communication device 500 includes display 501 and user interface 520. FIG. 5A illustrates the selection of thumbnail gallery 530 (shown on Figure B) from camera roll 510.

Camera roll 510 comprises the graphical images 511-599 stored on wireless communication device 500. In other examples, camera roll 510 may include only a subset of all the graphical images stored on wireless communication device 500. The subset may be selected by the user. For example, the user may have organized the graphical images into folders, by date, or some other method of categorizing images. The user may then choose a folder or define a criteria (e.g. images taken within a date range) to select the subset of graphical images. In other examples, the subset may be selected by default (e.g. every other graphical image or the first 50 graphical images).

FIG. 5B illustrates the unlock screen, prompting the user to correctly select and position graphical images from thumbnail gallery 530 on to geometric pattern 540. Thumbnail gallery 530 comprises graphical images 511, 515, 532, 547, 563, and 588. Geometric pattern 540 comprises individual positions 541-543. FIG. 5C illustrates the user correctly selecting and positioning graphical images 515, 532, and 588 on to geometric pattern 540. The function will be successfully unlocked.

Figure 6:
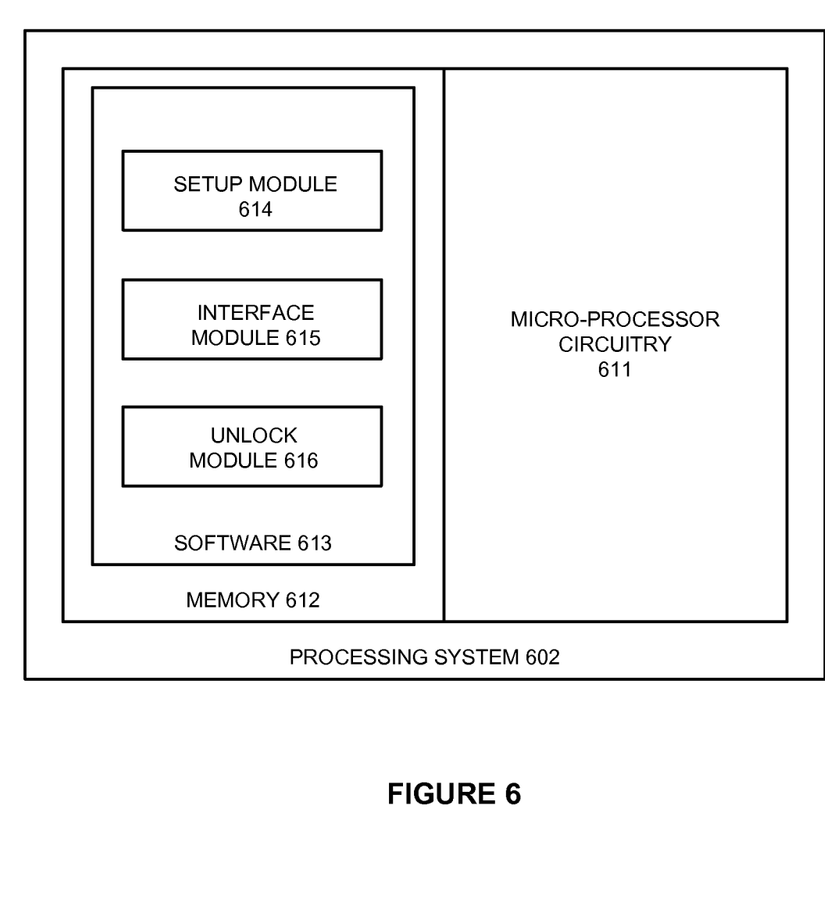
FIG. 6 illustrates the processing system shown in FIGS. 1, 3, and 4.

FIG. 6 illustrates processing system 602 to use graphical images in mobile security. Processing system 602 is an example of processing system 103 and 403, although these systems may use alternative configurations and operations. Processing system 602 comprises micro-processor circuitry 611 and memory 612. Memory stores software 613. Software 613 includes setup module 614, interface module 615, and unlock module 616. Software 613 comprises computer programs, firmware, or some other form of machine-readable processing instructions. Software 613 may include an operating system, utilities, drivers, network interfaces, applications, or some other type of software. When executed by processing circuitry 611, software 613 directs processing system 602 to operate the wireless communication device as described herein for wireless communication devices 100, 400, and 500.

In particular, setup module 614 directs processing system 604 to prompt the user to indicate a function to lock, a geometric pattern, graphical images, and individual positions. Interface module 615 directs the user interface to display selections to the user and receive user input. Unlock module 616 directs processing system 602 to prompt the user to position the graphical images on the geometric pattern in order to unlock the locked function.

Referring back to FIG. 1, wireless communication device 100 comprises Radio Frequency (RF) communication circuitry and an antenna. The RF communication circuitry typically includes an amplifier, filter, modulator, and signal processing circuitry. Wireless communication device 100 may include other well-known components such as a battery and enclosure that are not shown for clarity. Wireless communication device 100 may be a telephone, computer, e-book, mobile Internet appliance, media player, game console, wireless network interface card, or some other wireless communication apparatus—including combinations thereof.

User interface 102 comprises components that interact with a user to receive user inputs and to present media and/or information. User interface 102 may include a camera, speaker, microphone, buttons, lights, display screen, touch screen, touch pad, scroll wheel, communication port, or some other user input/output apparatus—including combinations thereof. User interface 102 may omitted in some examples.

What is claimed is:

1. A method of operating a wireless communication device to unlock a function by placing graphical images selected by a user in a geometric pattern selected by the user, the method comprising:

receiving first user input indicating the function to lock;

receiving second user input indicating the user's selection of the geometric pattern for placement of the graphical images;

receiving third user input indicating the graphical images selected by the user;

receiving fourth user input indicating individual positions of the graphical images on the geometric pattern;

processing the first, second, third, and fourth user inputs to lock the function;

receiving fifth user input indicating the individual positions of the graphical images on the geometric pattern; and processing the fifth user input to unlock the function.

2. The method of claim 1 wherein the first user input indicating the function to lock comprises the user's selection of the function to lock from a plurality of displayed functions.

3. The method of claim 1 wherein the second user input indicating the user's selection of the geometric pattern comprises the user's selection of the geometric pattern from a plurality of displayed geometric patterns.

4. The method of claim 1 wherein the third user input indicating the graphical images selected by the user comprises the user's selection of the graphical images from a plurality of displayed graphical images.

5. The method of claim 1 further comprising determining a thumbnail gallery which includes at least the graphical images selected by the user from which the fifth input is selected.

6. The method of claim 1 wherein the user selected geometric pattern comprises a two dimensional grid.

7. The method of claim 1 wherein the user selected geometric pattern comprises a one dimensional grid.

8. The method of claim 1 wherein the function to lock comprises wake-up from sleep.

9. The method of claim 1 wherein the function to lock comprises launching an application located on the wireless communication device.

10. The method of claim 1 wherein the function to lock comprises a financial transaction.

11. A wireless communication device comprising:

a user interface configured to receive first user input indicating a function to lock, receive second user input indicating a user's selection of a geometric pattern for placement of graphical images, receive third user input indicating the graphical images selected by the user, receive fourth user input indicating individual positions of the graphical images on the geometric pattern, and receive fifth user input indicating the individual positions of the graphical images on the geometric pattern; and a processing system configured to process the first, second, third, and fourth user inputs to lock the function and process the fifth user input to unlock the function.

12. The wireless communication device of claim 11 wherein the first user input indicating the function to lock comprises the user's selection of the function from a plurality of displayed functions.

13. The wireless communication device of claim 11 wherein the second user input indicating the user's selection of the geometric pattern comprises the user's selection of the geometric pattern from a plurality of displayed geometric patterns.

14. The wireless communication device of claim 11 wherein the third user input indicating the graphical images selected by the user comprises the user's selection of the graphical images from a plurality of displayed graphical images.

15. The wireless communication device of claim 11 further comprising determining a thumbnail gallery which includes at least the graphical images selected by the user from which the fifth input is selected.

16. The wireless communication device of claim 11 wherein the user selected geometric pattern comprises a two dimensional grid.

17. The wireless communication device of claim 11 wherein the user selected geometric pattern comprises a one dimensional grid.

18. The wireless communication device of claim 11 wherein the function to lock comprises wake-up from sleep.

19. The wireless communication device of claim 11 wherein the function to lock comprises launching an application located on the wireless communication device.

20. The wireless communication device of claim 11 wherein the function to lock comprises a financial transaction.

\* \* \* \* \*